Aug. 20, 1968   E. C. WAHLBERG   3,397,763
MULTIPLE TRANSACTION VENDING MACHINE
Filed July 8, 1966   9 Sheets-Sheet 1

INVENTOR
ERIC C. WAHLBERG

BY *Fisher, Christen, Sabol & Caldwell*

ATTORNEYS

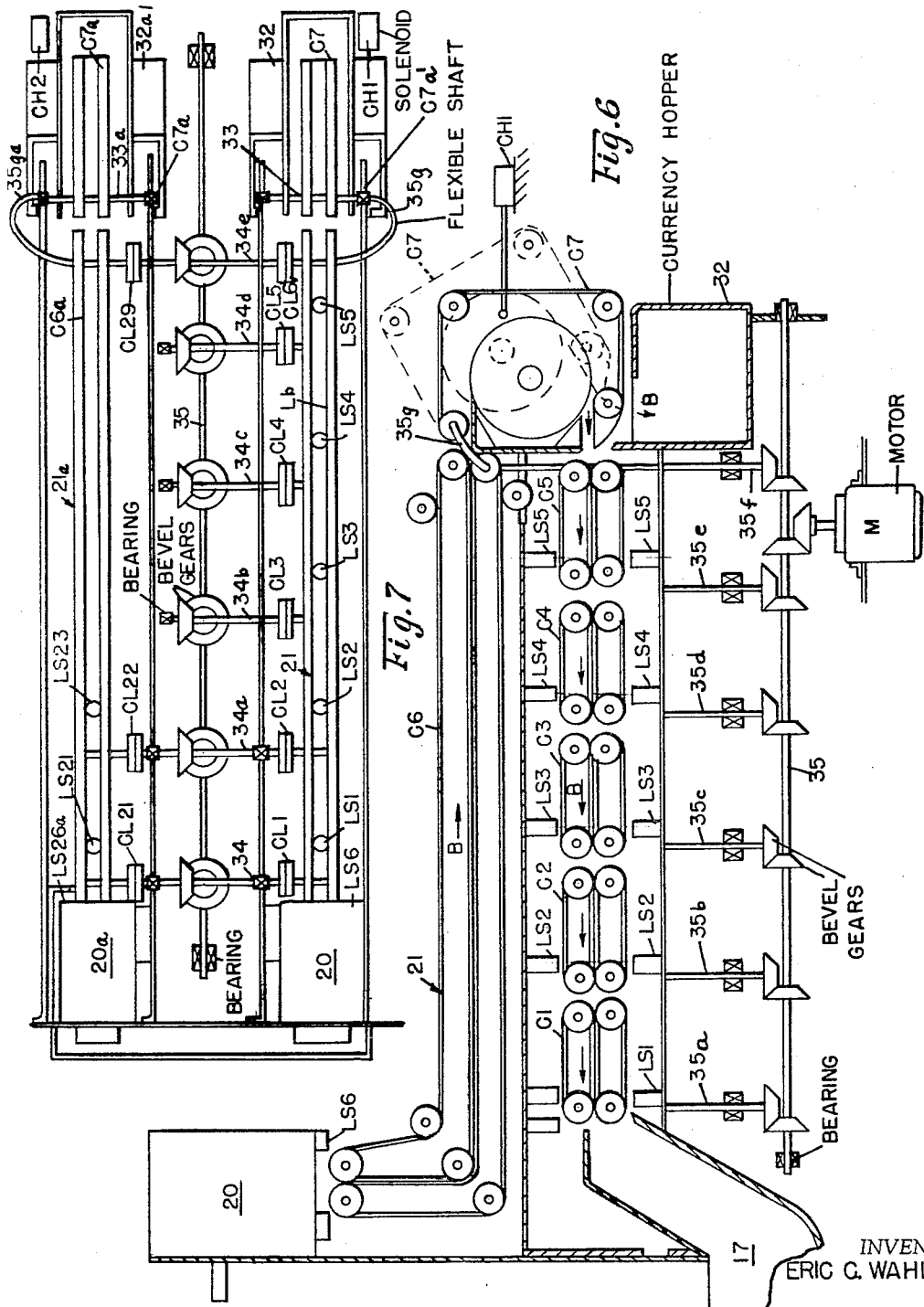

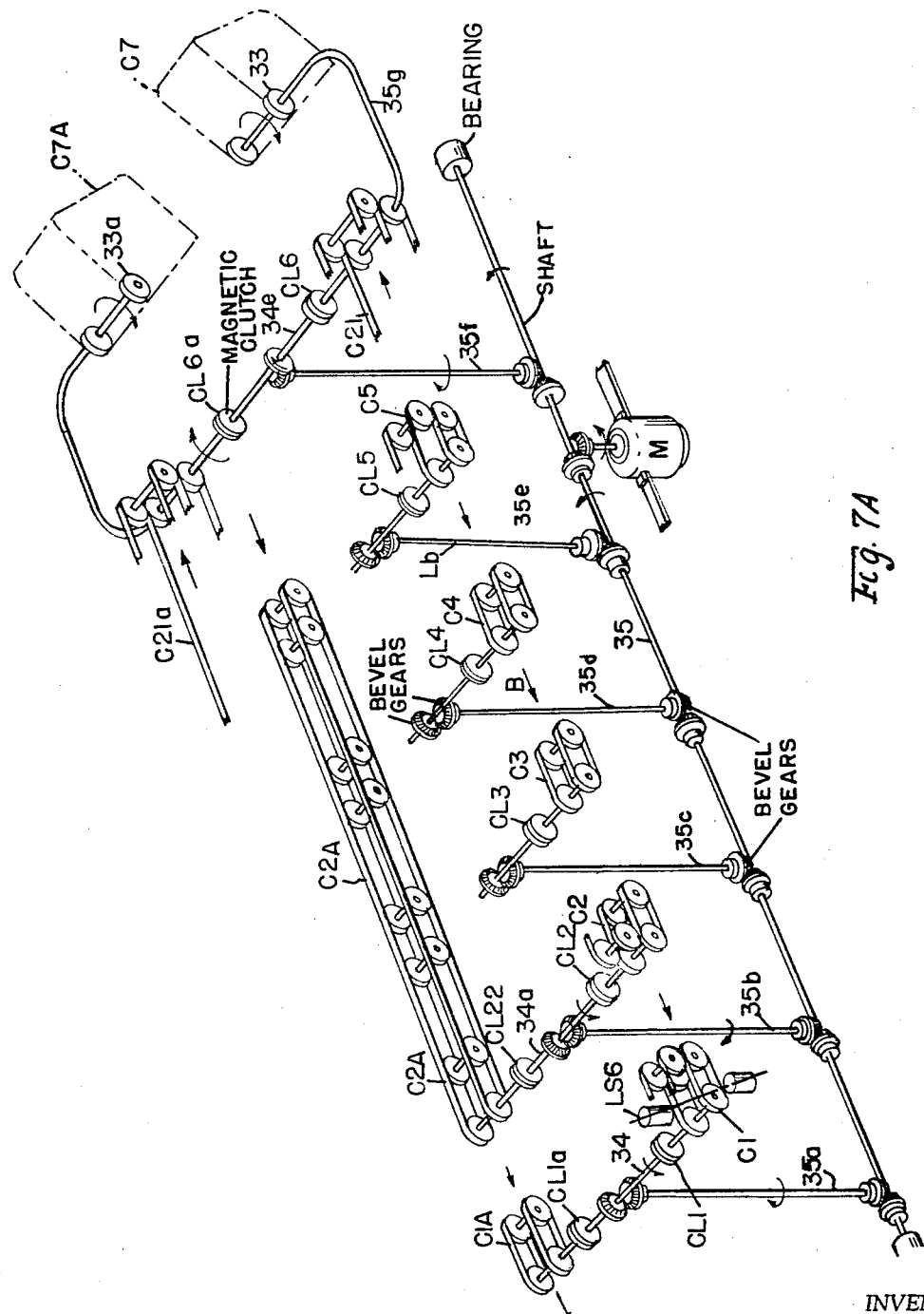

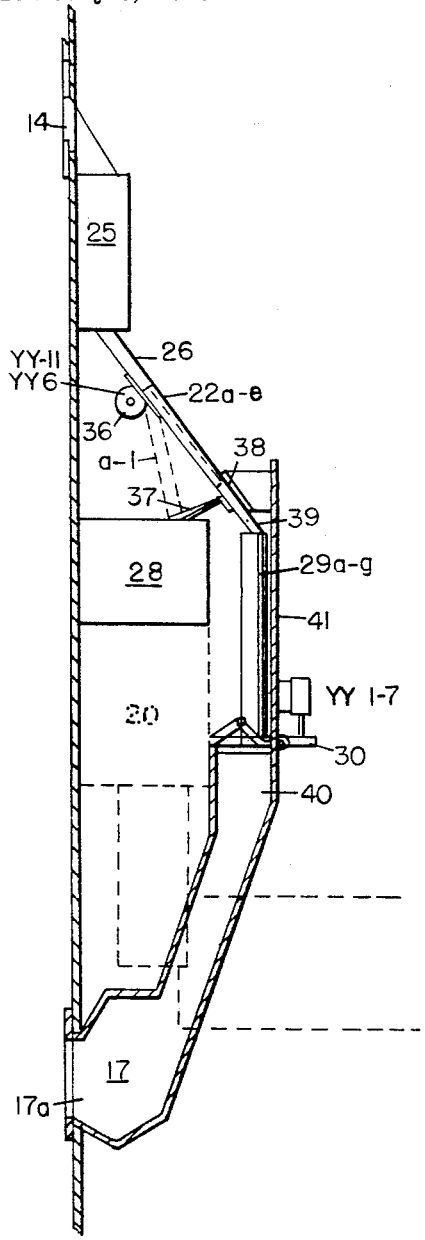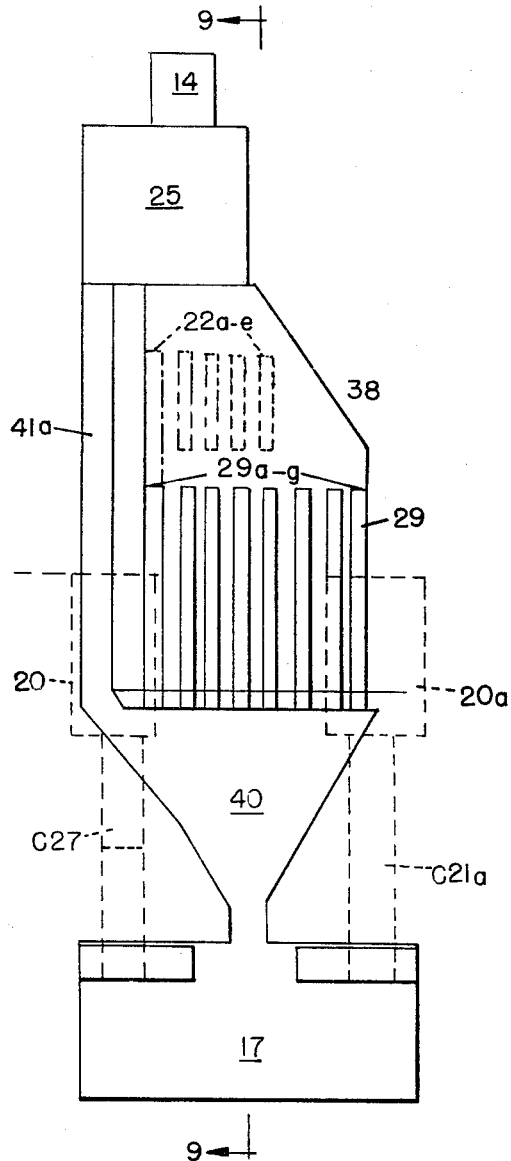

INVENTOR
ERIC C. WAHLBERG

United States Patent Office

3,397,763
Patented Aug. 20, 1968

3,397,763
MULTIPLE TRANSACTION VENDING
MACHINE
Eric C. Wahlberg, 32 8th St., Stamford, Conn. 06905
Filed July 8, 1966, Ser. No. 563,834
14 Claims. (Cl. 194—4)

ABSTRACT OF THE DISCLOSURE

A vending machine for dispensing change and selected goods after totaling the cost of the selected goods and comparing the total cost with the total money received by the machine wherein dispensing tubes are utilized to store coins received by the machine, dispensing conveyors are utilized to store bills received by the machine and the dispensing tubes and conveyors are also used to dispense change for later transactions.

---

This invention pertains to electrical circuitry and means for operating various kinds of change, receipt and dispensing devices, and in more particular, a vending machine for dispensing various packaged commercial items desired by a customer, making change and giving the customer a receipt therefor.

Many of the present electrically operated vending machines only operate on the insertion of an exact amount of change. Others operate on certain limits of change for a prescribed coin. For example, if a 50-cent coin is inserted in a particular vending machine and the item cost is 35 cents, the change returned to the customer would be 15 cents.

The present invention solves the above problems by providing a very flexible means of applying a commercial money changer to a desired marketing scheme of articles in a vending machine or the like while at the same time detecting deposited coins and paper money.

In the vending machine of the present invention the patrons deposited coins and bills of currency are available for making change in the purchasing of articles from the machine thus, saving the general replenishing of the currency and coin exchanger with new deposited money therein for making change after a purchase by a customer.

In the present invention the circuit means thereof includes money whereby the customer may not only initiate the dispensing of purchased articles upon insertion of the correct amount of coins and currency in the vending machine but may also accomplish the desired result upon the insertion of an excess of money which is returned to the customer when a completed purchase of articles is made.

Some of the primary objects of this invention are to provide circuitry and instrumentalities in a vending machine or the like which includes provision for the machine to hold and dispense a plurality of several types of articles having the same or different sales price, to compute the cost of any combination of these articles, to receive, reject and identify coins and currency, and to dispense the desired articles to customers.

Another object of the invention is to provide means in a vending machine for handling, detecting and issuing currency in various denominations and dimensional sizes.

A further object of this invention is to provide means for easy exchange of articles for replenishment and computing purposes.

Another object of the invention is to provide a novel circuitry responsive to an improved money-actuated device to dispense articles in a vending machine, give an accounting for receipt of coins and currency in various denominations, issue change in response to overpayment of the sale price and a receipt to the customer.

A still further object of the invention is to provide means in a vending machine to use the money deposited therein to provide change to a customer.

Another object of the invention is to provide means whereby change in coins and currency will not be dispensed without the purchase of an article of merchandise.

Other objects and advantages of this invention will be apparent to those skilled in the art after reading the following specification in connection with the annexed drawings, in which:

FIGURE 6 is an enlarged sectional view of the currency detecting and conveying mechanisms of FIGURE 1;

FIGURE 7 is a plan view of FIGURE 6;

FIGURE 7A is a perspective view of the conveyor driving means of FIGURE 7.

FIGURE 8 is an enlarged rear view of the coin receipt and dispensing mechanisms of this invention;

FIGURE 9 is a sectional view of FIGURE 8 taken on lines 9—9 as indicated;

Similar reference characters represent similar parts and functions as performed by this invention.

Figure 1:
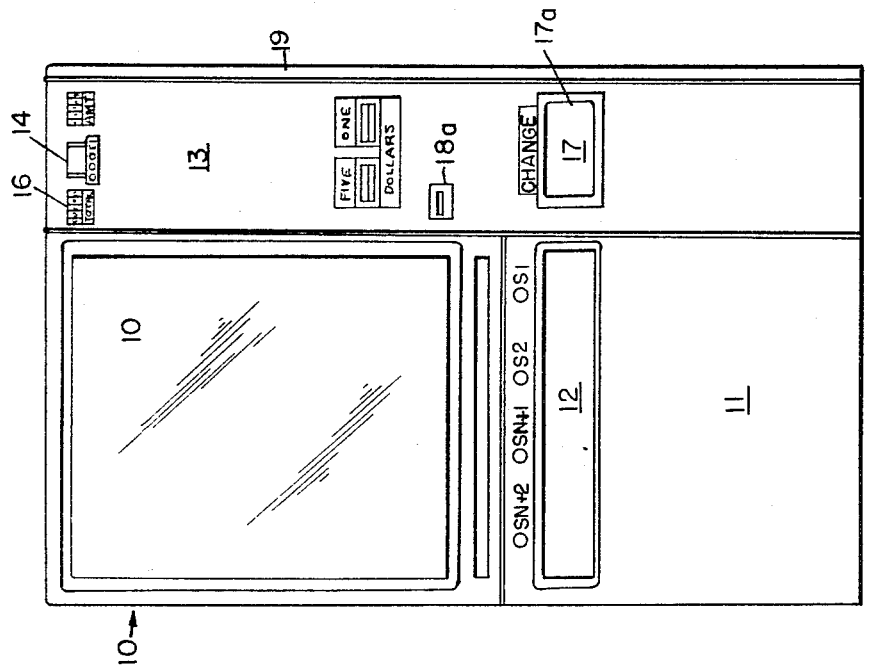
FIGURE 1 is a front elevational view of a preferred form of the invention.

In general, the embodiment of the invention as shown in FIGURE 1 and described below is for installation in an office building, hotel, market place or the like where condiments, cigarettes, candy or packaged articles, goods or similar articles of trade are selected and paid for by a customer and dispensed to same as a member of the general public.

Referring to FIGURE 1, the vending machine 10, comprises, in general, a hinged transparent door section 10a or the like provided for display of articles offered for sale and a stationary support section 11 below it. A purchased item compartment 12 with opening 12a provides means for gathering the items purchased as evidenced by the position of the article selector means $S_1$, $S_2$, etc., and a cabinet section 13 is provided for controls and receipt of money and expenditure of change. The front of this section comprises coin receptacle means 14 for receiving coins and currency receptacle means 15 for receiving currency, an indicator 16 which shows the total cost of a purchase, a change receptacle 17 and an opening 17a for returned change and a receipt means 18 having an opening 18a is also provided. The side of the cabinet has a hinged door 19 for access to controls and currency hoppers. An attractive article description (not shown) may be located at the lower edge of display door 10a or other suitable place as desired. The sale items are selected by operating selector switch means $S_1$, $S_2$, $SN+1$ and $SN+2$, each of which may be operated by being pushed, pulled or operated, depending on the desired mode of operation thereof. The above selector means actuate circuit and special purpose stepping switch means as hereinafter explained in connection with FIGURES 11, 12 and 13.

Figure 2:
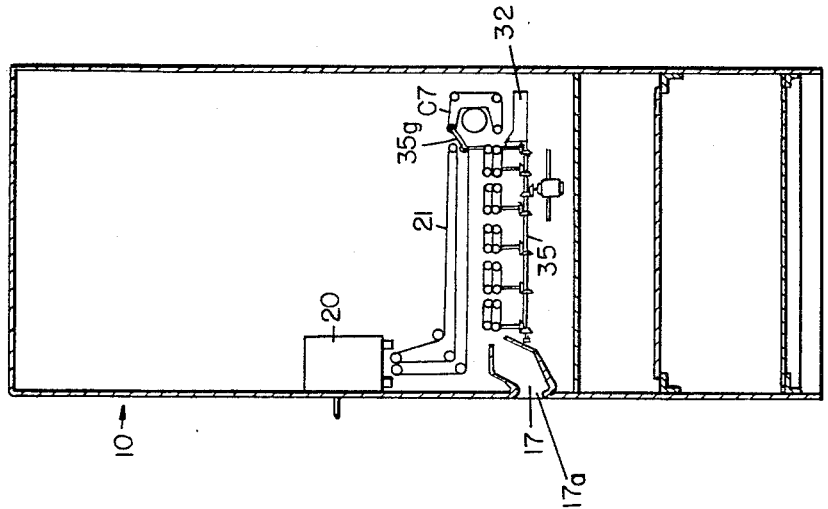
FIGURE 2 is a sectional side elevational view of FIGURE 1 showing the coin and currency mechanisms therein.

Referring to FIGURE 2, the bill validator and changer 20 and conveyor 21 are connected to the bill hopper and change receipt compartment 17 of cabinet 13 of FIGURE 1.

Figure 3:
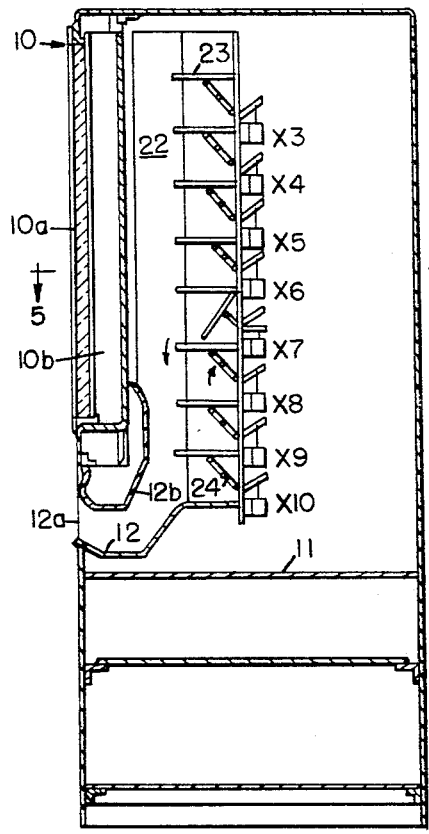
FIGURE 3 is a sectional elevational view taken through the article shelf compartment of FIGURE 1.

In FIGURE 3 the enclosed display area 10b is positioned above purchased item opening 12 above stationary support 11 of vending machine 10. A storage area 22 consisting partially of collapsible shelves 23 is located above opening 12a of chute 12b for dispensing purchased items as shelves 23 are selectively released. The shelves 23 are controlled by linkages 24 and solenoids X3–X10 are actuated by the circuits of FIGURES 11, 12 and 13. Opening of display area door 10a provides access to storage area 22 for loading and resetting shelves 24. Door 10a may have a lock thereon, as desired, to prevent unauthorized opening of the door.

Figure 4:
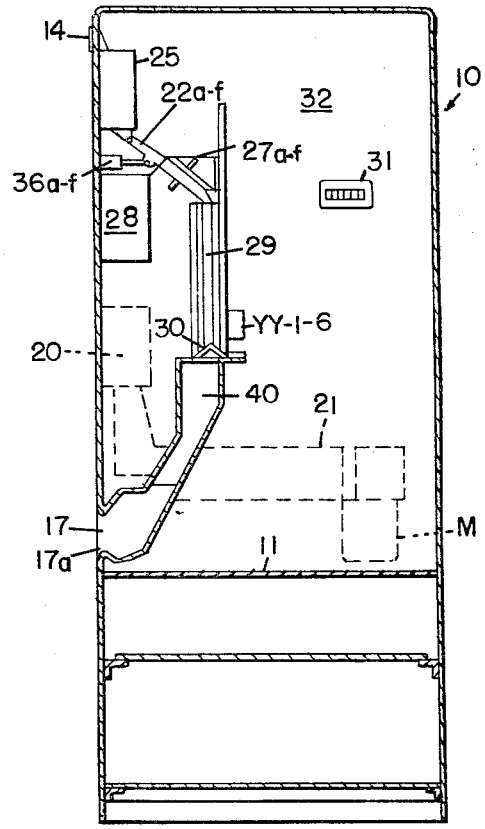
FIGURE 4 is a sectional elevational view taken through the coin mechanisms of FIGURE 1.

Referring to FIGURE 4, a side sectional view of cabinet 13 containing therein coin validator and acceptor 25, coin chute 26, with deflector 22a–f and coin storage hopper 28 is shown. Coin changer tubes 29a–29f are located above coin guide 40. The coin changer 29 is actuated through solenoids YY1–YY6, which actuate linkages 30. The coin chute 40 controls the flow of coins into change opening 17. A total sales indicator 31 is shown mounted on the inside partition 32 of FIGURE 5 and is interconnected by linkages or circuitry (not shown for clarity) to the article dispensing compartment 22. Shown in broken lines is an outline of bill change means.

Figure 5:
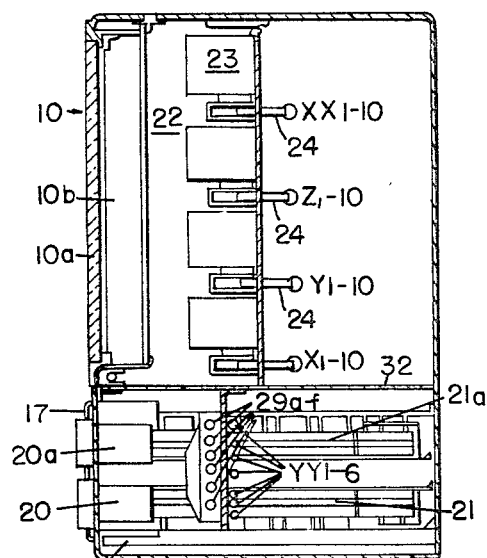
FIGURE 5 is a sectional plan view of FIGURE 3 taken on lines 5—5 as shown.

In FIGURE 5, the relative positions of the goods compartment 22, partition 32, coin tubes 29a–29f for halves, quarters, dimes, nickels and pennies, respectively, bill validators 20, 20a, and article support shelves 23 with respect to the glass or transparent plastic door 10a as shown. Shelves 23 are actuated or tripped by solenoids X1–X10, Y1–Y10, Z1–Z10, XX1–XX10 acting through their respective linkage means 24 to dispense chosen articles therefrom after currency is placed in either of bill validators 20 or 20a, or coins in coin tubes 29. Bill validators 20 and 20a uniquely cooperate with conveyors 21 and 21a in dispensing change in the form of currency to the customer in receptacle 17 after a purchase.

The driving means for the novel conveyor bill changers of FIGURES 6 and 7 comprises a system of conveyors selectively controlled by photo-electric limit switches or the like and magnetic clutch means, all driven by a gear means and common motor M for each bill validator 20 and 20a in response to currency inserted therein by a customer for purchase of articles in the new vending machine 10, as shown in FIGURE 7A.

Referring to FIGURES 6, 7 and 7A, one of the unique bill change conveyors is comprised, in general, of conveyors C1, C2, C3, C4, C5, C6 and C7 which cooperate with bill validator 20 and change receptacle 17 and currency hopper 32 in response to limit switches LS1, LS2, LS3, LS4, LS5 and LS6 photo-electric or other similar means which operates in response to bills of currency from validator 20 passing through the above conveyors in series. Conveyor C7 is shown pivoted about roller axis 33. The bills are first passed from bill validator 20 through conveyor C6 which in turn passes the bills through conveyors C7, C5, C4, C3, C2 and C1 as indicated by arrows B and then into receptacle 17. Should conveyors C1, C2, C3, C4 and C5 become filled with bills, then conveyor C7 will hinge upwardly by actuation of solenoid CH1, due to reaction of limit switches LS5 and LS6, as indicated in broken lines to allow other bills of currency to be disposited in currency hopper 32. Rotary shaft 33 of conveyor C7 is rotated by flexible shaft 35g being rotatably secured to shaft 34e rotated by drive shaft 35e and clutch CL6 driving parallel spaced belts LA and LB of conveyor C6 as shown. Magnetic clutch means CL1, CL2, CL3, CL4, CL5 and CL6 are selectively controlled by limit switches LS1, LS2, LS3, LS4, LS5 and LS6 respectively, as hereinafter described in connection with the operation of the circuits of FIGURES 11, 12 and 13. The limit switches LS1, LS2, LS3, LS4, LS5 are positioned between two lower spaced pairs of belts LA and LB and two upper spaced pairs of belts LC and LD to register bills of currency passing between the operating lower spaced pair of belts and the coating upper pair of spaced belts, as best shown in FIGURES 6, 7 and 7A. Likewise, limit switch LS6 is operative between a pair of spaced lower belts and a coacting pair of spaced upper belts.

Clutches CL1, CL2, CL3, CL4, CL5 and CL6 for the dollar change maker 20 are driven by drive shafts 34, 34a, 34b, 34c, 34d and 34e geared by bevel gears to vertical shafts 35a, 35b, 35c, 35d, 35e and 35f which are in turn driven through gear means on drive shaft 35 operatively connected to motor M as shown. Similarly, clutches CL21, CL22, and CL29 for the five dollar change maker 20a are driven by drive shafts 34, 34a and 34e. The main drive shaft 35 serves conveyor 21a through vertical shafts 35a, 35b and 35f and appropriate bevel gear means as shown. In other words, the conveyor system of bill changer 20a is a duplicate portion of the one shown for bill exchanger 20, as described above. The bill changers 20 and 20a each cooperate through the respective conveyors with currency receptacle 17.

Referring to FIGURES 8 and 9, coin accepter 25 feeds coin chute 26. The deflector 22 is hinged to chute 26 by solenoids YY1–YY6 operating hinge means 36. A coin guide 37 and stop 38 is provided to insure placement of coins in receptacle 28 or in chute 39. Chute 39 feeds coin tubes 29a–29f. The bottom of the coin tubes are located to allow coins therein to fall into coin change guide 40. Guide 40 allws coins to flow into receptacle 17. Coin tube operation is accomplished by selective circuit operation of solenoids YY1–YY6 to actuate linkages 30. The solenoids and coin tubes are mounted on plate 41. Coin tube 41a returns bad coins through hopper 40 and change dispenser 17 to the customer, as best shown in FIGURE 8.

For sake of clarity, the wiring to the various electrical connectors in FIGURES 1 through 9 are not shown.

Figure 10:
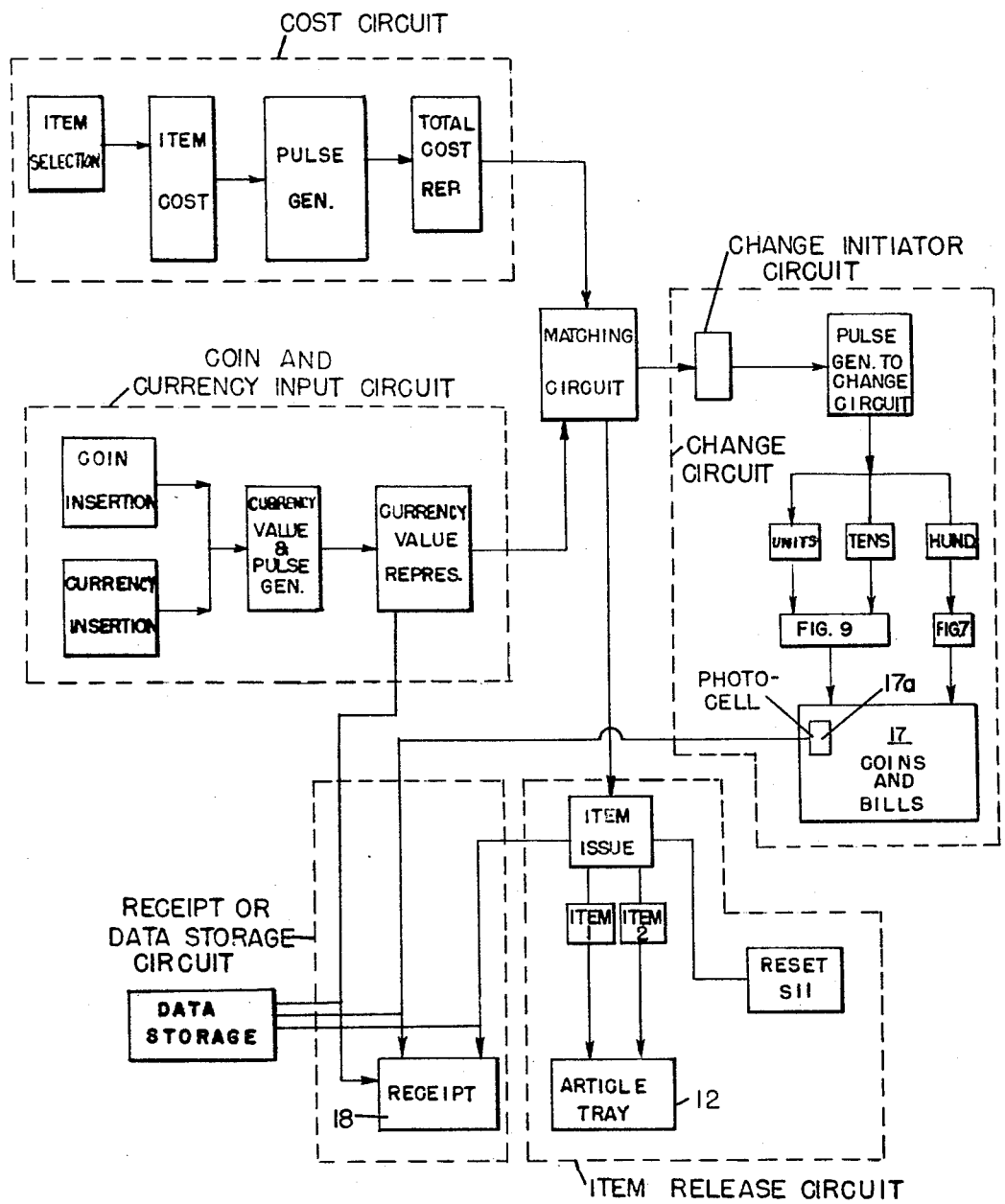
FIGURE 10 is a functional block diagram of some of the various and interrelated functions performed by the invention.
Figure 11:
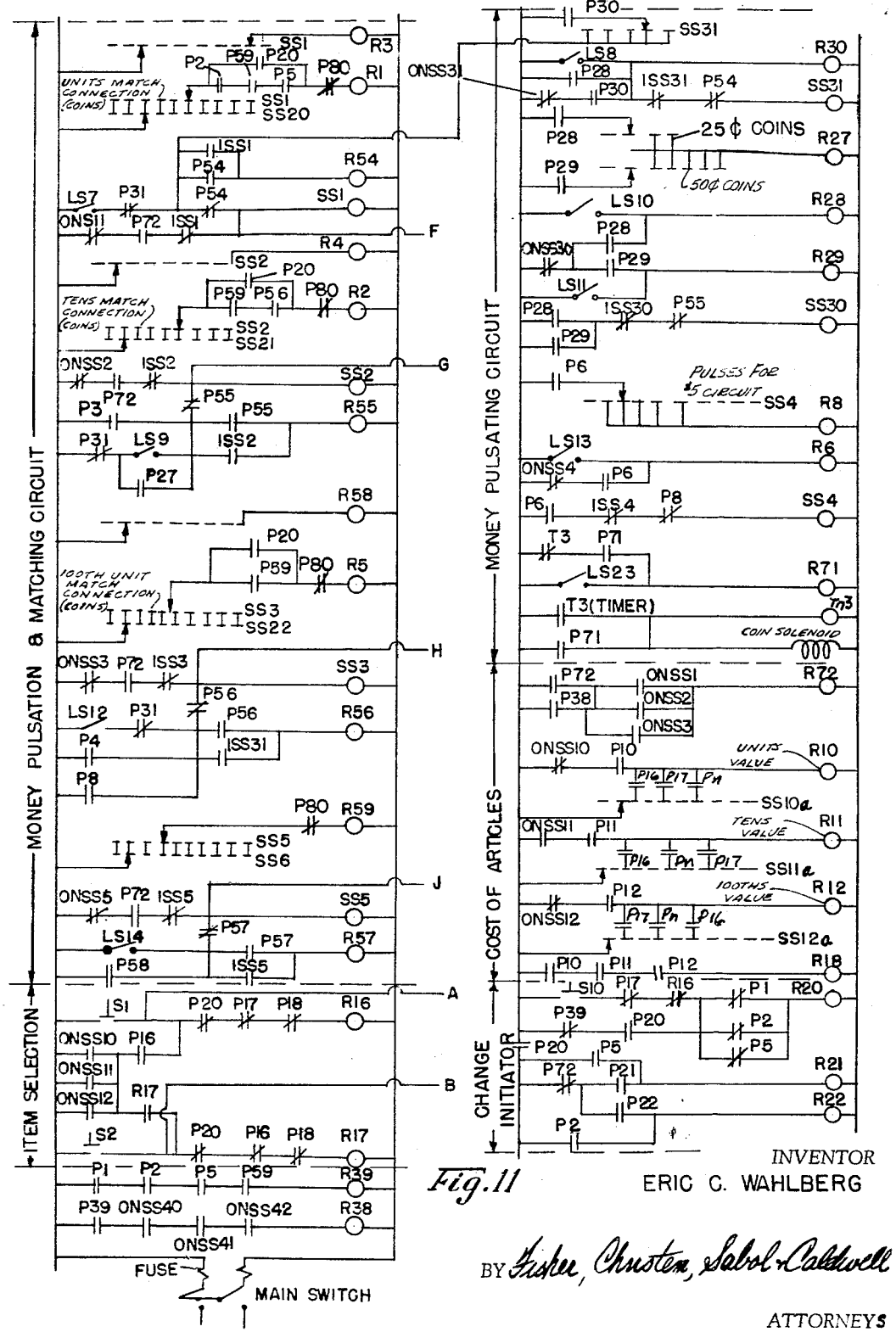
FIGURES 11, 12 and 13 are circuit diagrams for actuating the calculating, receipt and money changing mechanisms of this invention.
Figure 12:
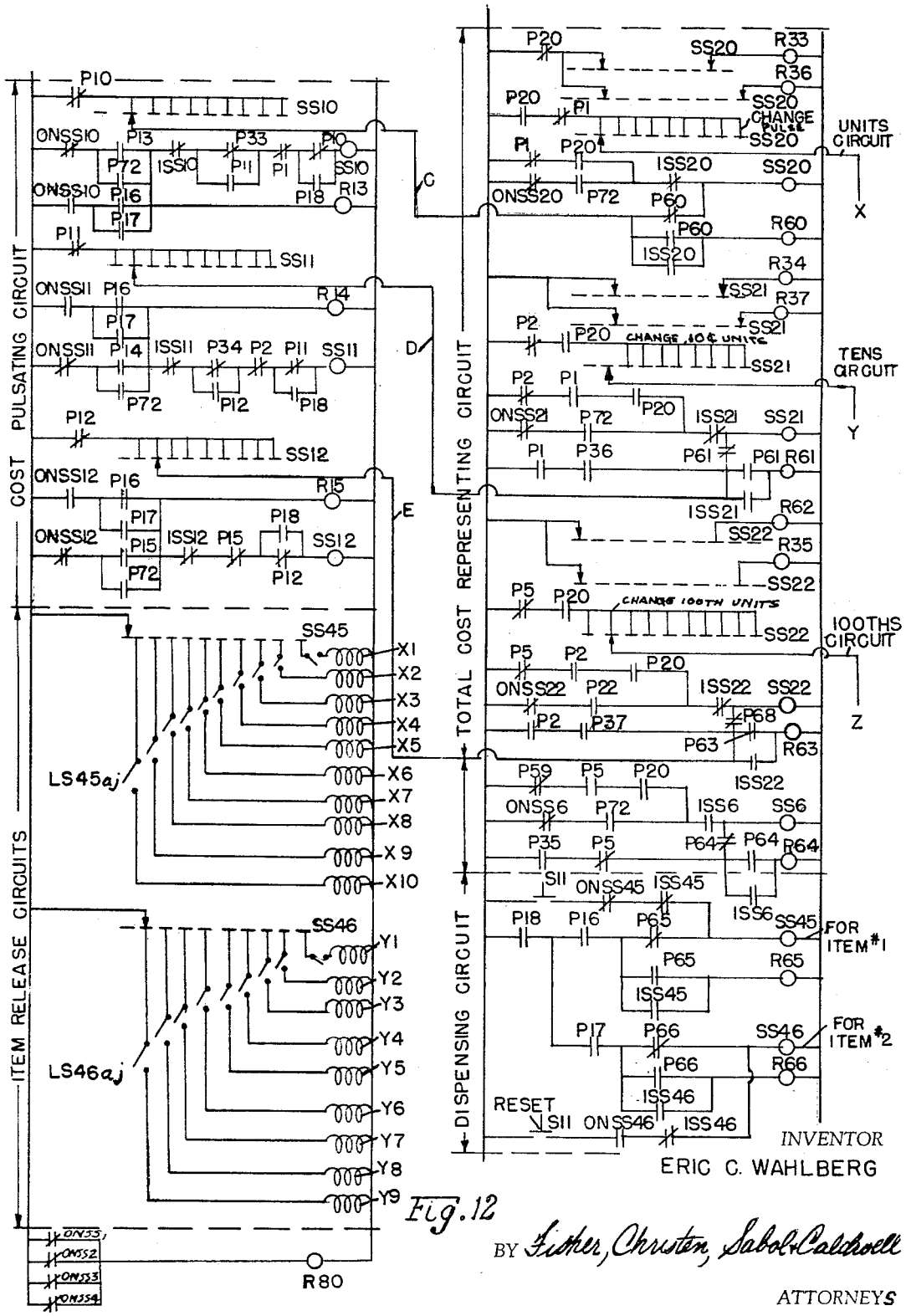
Figure 13:
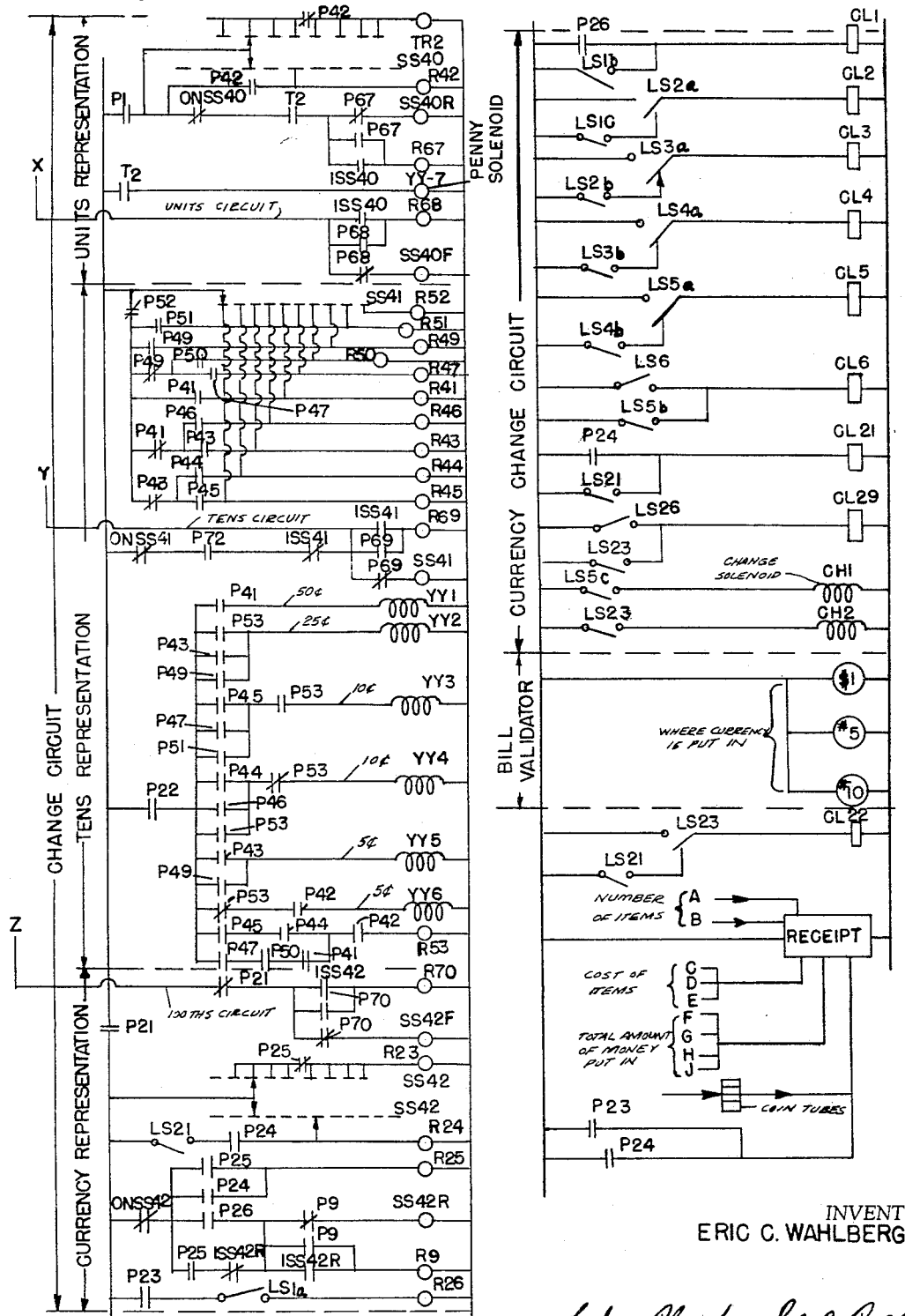

Referring to FIGURE 10, the interrelated functions of the mechanisms of FIGRES 1 through 9, as coordinated with the circuit functions of FIGURES 11, 12 and 13 are illustrated in functional block diagram form. The circuitry for operating the instant new vending machine 10 comprises in general, a cost circuit and a coin and currency circuit each of which has an output which feeds into a matching circuit which has an output to actuate an item issue circuit and an output which feeds into a change initiator which output actuates a pulse generator circuit to make change in coins as shown in FIGURE 9 and to make change in currency as shown in FIGURE 7. The total of the change is deposited in change tray 17 which has a photo-electric means for detecting and recording same on the receipt circuit. The item issue circuit comprises in general, circuits, reset means S11 or similar like means, and an article receiving tray 12. The inputs to the receipt circuit are also interconnected to the data storage circuit as shown.

Referring to FIGURES 10, 11, 12 and 13, the cost circuit of FIGURE 10 is comprised of an item selection circuit, an item cost circuit, a pulse generator circuit and total cost representing circuit.

The item selection circuit of FIGURE 10 is comprised of circuitry as shown in FIGURE 11.

The item cost representation circuit of FIGURE 10 also consists of other circuitry as shown in FIGURE 11.

The pulse generator circuit of FIGURE 10 is comprised of circuitry shown as cost pulsating circuit in FIGURE 12.

The total cost representation circuit of FIGURE 10 is comprised of circuitry shown as the total cost representing circuit of FIGURE 12.

The currency input circuit of FIGURE 10 comprises coin insertion circuitry, and currency insertion circuitry, the output of each circuit is then connected as an input to a currency value circuit and a pulse generator circuit. One of the outputs of these two circuits is connected as an input to a matching circuit and the other output of the currency value representation circuit is connected to a receipt circuit.

The currency input circuit of FIGURE 10 is comprised of a coin insertion circuit as indicated by the circuitry of limit switches LS7 through LS11 of FIGURE 11, and a currency insertion circuit as indicated by the bill validator circuit of FIGURE 13 and limit switches LS12–LS14, FIG. 11.

The output of the coin insertion circuit and the currency insertion circuit of FIGURE 10 is connected to a currency value and pulse generator circuit as indicated by the money pulsating circuit of FIGURE 11. The output of this circuit is connected to a currency valve representation circuit as indicated in the matching circuit of FIGURE 11.

The matching circuit of FIGURE 10 has an output connected to the change initiation circuit and another output connected to the item release circuit as indicated in FIGURES 12 and 13.

The change circuit of FIGURE 10 is comprised of a change initiator circuit being responsive to the matching output of the matching circuit, and is further comprised of a pulse generator to change circuit connected to the output of the change initiator circuit. The change circuit of FIGURE 10 is further comprised of the circuitry as represented by circuitry for change in units, tens and hundreds units as shown in FIGURES 7, 9, 10, 12 and 13, all interconnected to a coin and bill receptacle 17 which has a photo-electric cell having an output connected to receipt receptacle 18 of the receipt or data storage circuit of FIGURE 10 and as indicated in FIGURES 10, 11, 12 and 13.

The item release circuit of FIGURE 10 is comprised of the item issue circuit as represented by the dispensing circuit of FIGURE 12. The item issue circuit is connected to a reset switch S11 of the dispensing circuit of FIGURE 12. One of the outputs of the item issue circuit is connected to item 1 as represented by limit switches LS45a through LS45j and the other output of the item issue circuit is connected to item 2 as represented by limit switches LS46a through LS46j, as shown in FIGURE 12. The output release of the purchased items of the two above items is received in an article tray 12 on the front of the vending machine. Other items of the release circuit may be dispensed after a purchase in a similar manner.

The receipt device as represented by issue receipt device 18 of FIGURE 10 may be of a conventional design and interconnected to be responsive to the inputs thereto by the currency value representation circuit, the item issue circuit, and the response of the photo-electric cell 17a of the coin and bill receptacle 17. The response of the photo-electric cell 17a to the receipt device 18 prints in a conventional manner on the customer receipt the word "change" or other desired information notifying the customer of any change that may be due him after a purchase of items from the vending machine.

It should be noted that for clarity of operation, similar components in similar banks of circuits have the same numerals with different letter designations.

Bill validators and acceptors 20 and 20a are conventional and may be of any desired commercial type as manufactured by Coin Acceptors, Inc., St. Louis, Mo.; Standard Change Makers, Inc., Indianapolis, Ind.; Micro-Magnetics Industries, Palo Alto, Calif.; Rowe Manufacturing Co., Whippany, N.J., and others.

Coin acceptor 25 is conventional and may be of any desired commercial type as manufactured by National Rejectors, Inc., St. Louis, Mo., and others.

*Operation of vending machine*

The first step is to put money into the vending machine. Pennies step stepping switch SS1 directly through LS7, P31 and P54. Nickels step SS1 five times by means of limit switch LS8 through SS31. Dimes step switch SS2 through limit switch LS9. Quarter coins step switches SS1 and SS2 through limit switch LS10, stepping switches SS30 and SS31. Switch SS2 is stepped twice and switch SS1 is stepped five times for each 25¢ coin. Half dollar coins step switch SS2 through limit switch LS11, relay R29 and switch SS30 five times. A one dollar bill steps switch SS3 once through limit switch LS12. A five dollar bill steps switch SS3 through limit switch LS13, relay R6, and switch SS4 five times. A ten dollar bill (validator not shown) steps switch SS5 once through limit switch LS14. Thus a predetermined amount of money may be inserted to cover cost of several items to be purchased, which may vary in price, if desired.

A purchased item is selected by pushing switch S1, S2 or manually actuating a similar selector means. This brings either relays R16 or R17 into the circuit and determines the cost position on stepping switches SS10, SS11, and SS12. These stepping switches are then stepped through off neutral contacts ONSS10, ONSS11 and ONSS12, and contacts P33, P34, P1, P2, P5, P10, P11, P12 until P16 contact is reached on corresponding banks of switches SS10, SS11 and SS12 at which time contacts P10, P11 and P12 open and stop the stepping of switches SS10, SS11 and SS12. The stepping of switches SS10, SS11 and SS12 causes corresponding switches SS20, SS21 and SS22 to step an equivalent number of steps. Thus, the cost of the first item purchased is set into the computer circuit. Other articles may be added to this cost by pushing the appropriate switch similar to switch S1. Thus, a total cost has been inserted in the computer circuit of the machine.

When each item of cost has been inserted in the computer circuit as evidenced by relays R10, R11 and R12 being energized then switch SS45 is stepped once through contacts P18, P16 and P65. As a result of the above circuit operation the selected item of goods is released through stepping switch SS45 bank, LS45a and causes solenoid X10 operation of the item shelf 23 of FIGURE 3. Similarly, other items are released through their appropriate circuits and solenoids.

If the cost as represented by switches SS20, SS21 and SS22 is less than the money inserted as represented by stepping switches SS1, SS2, SS3, and SS5, then switches SS20, SS21 and SS22 are stepped by contact P20 when switch S10 is closed to request the vending machine to return the change. As a result of the stepping of switches SS20, SS21 and SS22, circuits are established through appropriate banks of stepping switches SS40, SS41, and SS42 to give correct change. Stepping switch SS20 steps switch SS40, and switch SS21 steps stepping switch SS41 and switch SS22 steps switch SS42.

Stepping switches SS20, SS21 and SS22 are stepped until relays R1, R2, R5 and R59 are energized through corresponding banks of stepping switches SS1, SS2, SS3, and SS5. The number of units change is now registered on switch SS40. The number of tens change are registered on SS41. The dollar bills are registered on switch SS42. By following the circuits of the energized relays R41 and R42, the correct number of nickels, dimes, quarters and halves will be issued when contact P22 is closed. Pennies are issued by the circuit of stepping switch SS40 banks and if the number is greater than five, the number above five will be issued and the equivalent of a nickel registered in relay network of switch SS41. If there are less than five, that number will be issued with no nickel transfer.

Similarly the number of dollars will be issued for position of SS42. If value is greater than five, that number of singles above five will be issued plus a five dollar bill.

If value is less than five, then only that number of singles will be issued. The issuing will commence only when contact P21 is closed, as determined by the requirement of stepping switches SS3 and SS22.

*Dollar changer*

LS1, LS2, LS3, LS4, LS5 and LS6 are limit switches which control the corresponding clutches for moving the conveyors of FIGURES 6, 7 and 7A cooperating with bill validator 20.

If stepping switch SS42 has been stepped sufficiently forward the number of dollars as represented by pulses generated when SS22 was stepped to match SS3 to balance cost and money received, then the actual dollar difference is represented on stepping switch SS42. Contact P21 closes as a result of dollar stepping switches for cost SS22 and money inserted SS3 having matched. This causes relay R23 to energize through SS42 bank and P21 and close the circuit to relay R26 if there is a bill in the conveyor C1 as evidenced by LS1a being closed. This causes switch SS42 to step back once. When a dollar bill on conveyor C1 has passed out of the conveyor and another has entered, the above circuit is ready to deliver the second bill in a similar manner. This continues until either the sixth contact representing $5 is reached or the first contact is reached. Limit switch LS1a indicates by its closed position that there is a bill in the conveyor C1. Likewise, limit switch LS1 indicates that there is a bill in the conveyor C1 when it is open. Closing of contact P23 and limit switch LS1a energizes relay R26 which closes contact P26 and energizes clutch CL1 to move a bill out into receptacle 17. When the bill is out of conveyor C1, limit switch LS1a will open causing relay R26 to deenergize and to open circuit to conveyor C1, but limit switch LS1b closes to keep conveyor CL1 energized and C1 running. Conveyor C1 will continuer to operate until limit switch LS1b opens. LS1b opens when a bill from conveyor C2 has gone to a predetermined point in conveyor C1. A bill will be fed from conveyor C2 only if limit switch LS2a indicates by its closed position that there is a bill in its corresponding conveyor C2 and if limit switch LS1c is closed indicating that there is no bill in conveyor C1. Since conveyor C2 will have no bill after transfer to conveyor C1, limit switch LS2b is closed and if conveyor C3 has a bill in its clutch CL3 will be energized to feed a bill into conveyor C2. This contines until the bill has left conveyor C3. Additional bills are passed out by the backward stepping of switch SS42 as it is sequenced by limit switch LS1a and contact P26. If stepping switch SS42 should pass contact six of switch SS42 then relay R24 would be energized, and the dollar bill circuit would be opened by contact P24. Then stepping switch SS42 would be stepped to zero contact without operating the dollar conveyors C1–C5. But, as with the dollar conveyors C1–C7, and relay R24 would cause conveyor C1A to convey a bill to the receptacle 17. Also, the empty conveyor C1A would be filled with another bill from a similar conveyor C2A ahead of it in the same manner as described above.

If a one dollar bill is inserted in the discriminator, and if it is passed, it will actuate limit switch LS6 to energize conveyor CL6. This causes output conveyor C6 to run. When the bill has passed by limit switch LS6 conveyor C6 will stop. If conveyors C1, C2, C3, C4 and C5 are full and there is a bill in the output end of conveyor C7, this last bill will be deposited in the bill hopper 32 as the conveyor C6 receives the bill from the discriminator 20. If conveyors C1–C5 are not filled, the bill will be fed into conveyor C5. The same procedure is followed for the $5 circuit C21a. Thus, change can be made for any amount up to ($9.99) difference in cost and inserted money. The $10 discriminator is not shown in FIGURES 1–9, but is shown in circuit diagrams, FIGURE 13. It is understood that one is needed to require a $5 change circuit.

*Operation of circuits*

Stepping switch SS1 is stepped once for each penny inserted. Pennies operate limit switch LS7 to step switch SS1 once through contacts P31 and P54. Also, switch SS1 is stepped five times for each nickel and 25¢ coin inserted. Nickels operate limit switch LS8 to step switch SS1 through switch SS31 and contacts P30 and P54. A 25¢ coin operates limit switch LS10 to step switch SS31 through contacts P28 and ISS31. In turn this steps switch SS1 through switch SS31, and contacts P54 and P30.

Stepping switch SS2 is stepped once for each dime. Dimes operate limit switch LS9 to step stepping switch SS2 once through contact P55. Also, stepping switch SS2 is stepped twice for each 25¢ coin inserted in the vending machine 10. A 25¢ coin operates limit switch LS10 to step switch SS2 twice through switch SS30 by means of contacts P28 and ISS30–P28, stepping switch SS30, relay R27, and contacts P27 and P55. Stepping switch SS2 is stepped five times for a 50¢ coin. A 50¢ coin operates limit switch LS11 to step stepping switch SS2 five times through switch SS30 similar to the 25¢ coin described above. Limit switch LS11 energizes relay R29 which causes stepping switch SS30 to stop. Pulses are generated on stepping switch SS30 bank by means of relay R27. This causes stepping switch SS2 to step by means of contacts P27 and P55.

Stepping switch SS3 is stepped once for each dollar. A dollar bill operates limit switch LS12 which steps stepping switch SS3 once through contacts P31 and P56. A $5 bill steps switch SS3 five times. A $5 bill operates limit switch LS13 to energize relay R6. Contact P6 steps switch SS4, which through its bank and contacts P6 and P8 steps through pulses generated by contact P8, stepping switch SS3 through contact P56 five times.

When stepping switch SS1 reaches the tenth or zero position, relay R3 is energized and steps stepping switch SS2 once through contacts P3 and P55.

When stepping switch SS2 reaches the tenth or zero position, relay R4 is energized and steps stepping switch SS3 once through contacts P4 and P56.

When stepping switch SS3 reaches the tenth or zero position, relay R58 is energized and steps stepping switch SS5 once through contacts P58 and P57.

Stepping switch SS5 is stepped once for each $10 bill. A $10 bill operates limit switch LS14 and steps stepping switch SS5 through contact P57. Coin solenoid 36a operates when coin limit switch LS23 is actuated. As each coin enters the coin chute 26, limit switch LS23 is actuated. This causes coin solenoid 36a to operate to allow no other coin to enter until it is counted into the computing circuit. A timer Tr3 is operated by limit switch LS23 to give sufficient time for a coin to be counted. In the circuit, limit switch LS23 closes to energize relay R71 which in turn locks itself in through contact T3, and contact P71. Relay R71 also closes circuit to timer Tr3 through contact P71. Timer Tr3 is locked in through T3 contacts of timer Tr3 which holds coin solenoid 36a in circuit a preset time as measured by suitable cam rotation (not shown) or time elapse magnetic decay circuits as understood by those skilled in the art. In other wards, timer Tr3 is for unique smoothing operations of different contact responses of relays to prevent false counting in the circuit networks.

Stepping switches SS10, SS11 and SS12 are costs representing stepping switches. One bank of each is used as a pulse generator. A second bank of each switch is used to represent cost of articles. Cost representation is accomplished by connection by circuit through corresponding bank contacts to a corresponding relay by means of cost relay contacts represented by P16 and P17 or similar contacts. When item button S1 is closed, relay R16 will be energized. This closes P16 contacts as representing the cost on cost bank contacts P16 which also includes circuits to corresponding stepping switches SS10, SS11, and SS12. This causes these switches to step until the corresponding contact P16 on the corresponding cost bank is reached. When this occurs, corresponding relays R10, R11, and R12 are energized. This causes stepping of the above stepping switches to stop. When all three of the above relays are energized relay R18 is energized. This indicates that the cost of the article chosen has been counted and pulsed into corresponding stepping switches SS20, SS21, and SS22 through the corresponding bank of stepping switches SS10, SS11 and SS12. When relays R10, R11 and R12 are energized the pulsing bank of contacts of SS10, SS11, and SS12 are opened. Thus, stepping switches SS20, SS21, and SS22 are stopped.

Stepping switches SS10, SS11, and SS12 continue to step until their contacts on SS10, on SS11, on SS12, are reached. The cost item circuit is then reset, and another item of purchase may now be chosen provided relays R1, R2, R5 and R59 have not been energized. The same procedure as above is followed for succeeding items of purchase.

When the cost of the first item is completely in the computer circuit section and the currency steppers have indicated a deposit equal to or greater than the cost, one of the items is released by the stepper as for example, switch SS45 by having stepped once through contacts P18, P16, P65, and switch SS45. Similarly, an item chosen as represented by selector means S2, would similarly be released by switch SS46 through contacts P18, P17, P66 and switch SS46. The contacts of SS45 bank are connected through limit switches to shelf release solenoids as shown in FIGURES 3 and 5. As the contact arm is moved along the contact bank, solenoids are sequentially energized to release the corresponding shelf and allow the item on the shelf to be deposited in the receptacle 12 in the front of the enclosure.

When relays R10, R11 and R12 are energized, relay R18 is energized through contacts P10, P11 and P12. This causes stepping switches SS10, SS11 and SS12 to step to off neutral positions through contacts P18, P12, P11, interrupter switches ISS10, ISS11 and ISS12, off neutral switches ONSS10 and ONSS12, and contacts P13, P14 and P15, respectively.

Stepping switches SS20, SS21 and SS22 are summation switches which receive their pulses from corresponding item cost stepping switches SS10, SS11 and SS12. One bank of each stepping switches S20, S21 and S22 are used to hold corresponding cost stepping switches SS10, SS11, SS12 until next higher cost stepping switch has completed its cost insertion. This is done on the 9th contact of the bank. The second bank of the stepping switches SS20, SS21 and SS22 is used to transfer to the next higher stepping switch. The third bank of stepping switches SS20, SS21 and S22 are used to match the respective currency stepping switches S1, S2, S3 and SS5. A fourth bank of contacts of these switches is used for pulse generation.

When the third bank of stepping switches SS1, SS2, SS3, SS5, and SS20, SS21, SS22 and SS6 match relays R1, R2, R5 and R59 are energized and no further stepping of stepping switches SS20, SS21 and SS6 occurs. However, if the third banks have not arrived at match position then there is still currency credit available in the machine and the customer may have an additional item dispensed to him or have the change returned to him. The change may be obtained by pushing switch S10 which energizes relay R20 if no item is in the process of being registered. Stepping switches SS20, SS21, SS22, SS6 are stepped through contact P20. However, switch SS21 does not step until switch SS20 has reached match point as evidenced by relay R1 being energized and closing contact P1 in switch SS21 circuit. Similarly, stepping switch SS22 does not step until switch SS21 has reached its match point. While switches SS20, SS21, SS22 and SS6 are stepped as a result of S10 being operated, pulses are generated on the fourth bank of stepping switches SS20, SS21, SS22, SS6 as a result of contact P20 closing. Stepping switch SS20 pulses are used to step bidirectional stepping switch SS40. When relay R1 is energized as mentioned above, stepping of stepping switch SS40 forward ceases. Since contact P1 in stepping switch SS40 reverse circuit is closed, stepping switch SS40 will step backwards as monitored by timer Tr2. If the wiping arm of stepping switch SS40 is beyond the sixth contact, pennies will be released from the penny tube in the amount indicated by the number of contacts beyond the sixth. When the sixth contact is reached, relay R42 is energized causing itself to lock into the circuit through contacts P42 and P1. Also the penny releasing circuit is opened by contact P42 so that further backward stepping does not release further pennies. However, if the contact arm does not reach the sixth position when backward stepping is begun, then penny release would occur as above. Energizing of relay R42 also closes contact P42 in relay R53 circuit and the 5¢ coin release circuit.

Pulses generated by the fourth bank of contacts of stepping switch SS21 are used to step stepping switch SS41. Each contact of switch SS41 is connected to a relay. As wiping contact arm of switch SS41 sequentially makes contact with the contacts of stepping switch SS41 the corresponding relay is energized and locks itself in, and in some cases drops out the previously energized relays. In the coin release circuit, the contacts of the relays mentioned above determine the type and number of coins to be issued. As an example, the stepping switch contact arm is shown in the circuit positioned on the fourth contact, which means that thirty cents will be required to make change. This indicates that relay R43 should be energized and locked in. In so doing, however, the previously energized relays R44 and R45 are deenergized. In the coin release circuit relay R43 in the 25-cent coin circuit is closed and contact P43 in the nickel circuit is closed. Thus, when contact P22 is closed, which occurs when contact P2 of the match relay is closed, one quarter and one nickel will be released in response to the position of the contact arm of stepping switch SS41.

Pulses generated by the fourth bank of contacts of stepping switch SS22 are used to step switch SS42 forward. This continues until match contacts of SS22 and SS5 are reached at which time contact P5 opens and switch SS22 stops stepping. At this time relay R21 is energized and shifts the circuit from forward stepping to reverse. If contact arm of switch SS42 is positioned beyond the sixth contact then relay R23 will be pulsed once for each contact beyond the sixth contact. When the contact arm arrrives at the sixth contact, relay R24 is energized and locked in through limit switch LS21, and contact P25 will then step switch SS42 backward to off neutral without further pulsing of relay R23 since contact P25 is open in the relay R23 circuit. However, if the contact arm had not reached the sixth contact in its forward motion then relay R23 would be pulsed as the stepping switch moves backwards to the neutral position. When the contact arm of switch SS42 is energizing relay R23, and if there is a dollar bill in the conveyor C1, relay R26 will be energizing. This energizes clutch CL1 and starts conveyor C1 to dispense the dollar bill. Meanwhile, stepping switch SS42 has stepped back one step, when the bill is out of conveyor, as indicated by LSLA being open, then relay R26 is deenergized. This mode of operation of the circuit continues as long as there are bills in conveyors C1–C6, until SS42 has reached off neutral.

When conveyor C1 is empty, limit switch (a photoelectric cell) LS1a is closed and conveyor C1 continues to run. Also, conveyor C2 continues to run because limit switch LS1b is closed and the position of limit switch LS2a indicates a bill in conveyor C2. Thus, the bill in conveyor C2 will be fed into conveyor C1 until LS1a opens and stops conveyor C1. Conveyor C2 will continue to run because limit switch LS3 has shifted to continue to energize conveyor C12. The above conveyors are energized and deenergized to feed dollar bills to the conveyors until all conveyors are filled as indicated by open circuits to their respective clutches. As many of these conveyors may be placed in series as is practical for making change in dollar bills.

In a similar manner, when the contact arm of switch SS42 is on the sixth contact, relay R24 is energized and locked in the circuit and in turn energizes relay R25 through contact P24 this steps switch SS42 to contact ONSS42. Also, conveyor CL10 is energized to dispense a $5 bill, relay R25 is deenergized by contact ONSS42, but the clutch of the second conveyor for $5 bills will continue to operate until another $5 bill has been positioned on the conveyor.

The $5 bill identifier conveyor mechanisms of bill validator 20a operate in a manner similar to the $1 identifier 20 above, that is, when the bill comes out of the identifier it trips limit switch LS26 which causes the magnetic clutches to be enerfiized and drive conveyors C21a, C7a, C2a and C1a. This causes the bill to be picked up by the conveyor. If the conveyors are full, then a bill from the end of C7a will be deposited in the hopper 32 by the swinging of the conveyor C7a about pivot point C7a'. A solenoid CH2 may be used to pivot same and limit switch LS23 opens to allow solenoid CH2 to release the conveyor C7a to its normal position of feeding conveyor C2a.

Resetting of the machine is done automatically by relay R17 which is controlled by relays R38 and R39 and contacts P1, P2, P5, P59, ONSS40, ONSS41, ONSS1, ONSS2, etc. which deenergizes relay R72. Then the vending machine is ready for re-use.

Normal switches and fuses are added, as desired, to the circuit for safety and circuit protection.

From the circuit it is evident that a number of data may be taken and translated into printed or visual records or incorporated into stored data and the like by appropriately attaching such equipment to the circuits of the drawings as understood by those skilled in the art.

From the foregoing it will now be seen that there is herein provided an improved vending machine and new actuating circuitry therefor which accomplishes all the objects of this invention, and others, including many advantages of great practical utility and commercial importance.

As many embodiments may be made of this inventive concept as obtain within the purview of this invention as desired by those skilled in the art without departing therefrom. Therefore, it is to be understood that all matter herein is to be interpreted merely as illustrative, and not in a limiting sense.

What is claimed is:

1. In a vending machine, the combination comprising
    first means for receiving money,
    second means for totaling the amount of money received,
    third means for selecting goods in the machine,
    fourth means for indicating the cost of each of the goods selected,
    fifth means for totaling the costs indicated by said fourth means,
    sixth means for comparing the total of said second means with the total of said fifth means,
    seventh means responsive to said sixth means to dispense change if the total of said second means exceeds the total of said fifth means, and
    eighth means responsive to said sixth means to dispense the goods selected if the total of said second means equals or exceeds the total of said fifth means.

2. The invention as recited in claim 1 wherein said first means includes means for receiving coins and bills and said seventh means includes means for dispensing change in coins and bills.

3. The invention as recited in claim 2 wherein said first means further includes means for separating the coins and bills according to value and storing the coins in tubes and the bills in conveyors whereby the received money may be used for making change in further transactions.

4. The invention as recited in claim 1 wherein said eighth means includes means for issuing a receipt having data thereon according to the total cost of the goods selected.

5. The invention as recited in claim 1 wherein said eighth means includes means for storing data representing the money received, the total cost of the goods selected and the change dispensed.

6. In a money actuated machine, the combination comprising
    first means for receiving paper money,
    storage means including a plurality of conveyor belts,
    second means for conveying the paper money from said first means to said storage means,
    collection means,
    third means for conveying the paper money to said collection means when said storage means is full, and
    fourth means for actuating said storage means to dispense the paper money whereby received in one transaction may be dispensed in another transaction.

7. The invention as recited in claim 6 wherein said storage means includes a plurality of photocells each associated with one of the plurality of conveyor belts to indicate the presence of paper money therein.

8. A vending machine comprising
    first means for selecting items in the machine,
    second means for representing the cost of each item selected,
    third means for totaling the costs represented by said second means,
    fourth means for receiving money in coins and bills,
    fifth means for conveying the coins received to storage tubes according to value,
    sixth means for conveying the bills received to storage conveyors according to value,
    seventh means for totaling the amount of money received,
    eighth means for comparing the totals of said third means and said seventh means and for providing an output indicating the difference therebetween,
    ninth means responsive to the output of said eighth means to dispense change in coins from the storage tubes and in bills from the storage conveyors, and
    tenth means for dispensing the selected items in response to the output of said eighth means.

9. The invention as recited in claim 8 wherein said second means includes means for providing pulses to indicate the cost of each item selected, said third means includes means for receiving the pulses from said second means and means for providing pulses indicating the total cost, said seventh means includes means for providing pulses indicating the total money received, and said eighth means includes means for receiving the pulses from said third means and said seventh means and means providing pulses indicating the difference therebetween.

10. The invention as recited in claim 8 wherein said fifth means includes means for conveying the coins received to a hopper when the coin tubes are full and said sixth means includes means for conveying the bills received to a hopper when the bill conveyors are full.

11. The invention as recited in claim 8 wherein said ninth means includes means for dispensing all change simultaneously.

12. In a money actuated machine, the combination comprising
    first means for receiving bills of various denominations,
    a plurality of second means each for storing bills of a different denomination and each of said second means including a plurality of serially connected conveyors each of which is adapted to hold one of the bills,
    third means for conveying the received bills to said second means according to their denomination, and fourth means for actuating said second means to dispense the bills whereby the bills received may be used to make change in later transactions.

13. The invention as recited in claim 12 wherein said fourth means includes a plurality of photocells and driving gears for controlling the dispensing of bills.

14. The invention of claim 12 wherein said plurality of second means includes a hopper and means for placing bills in said hopper when said plurality of conveyors cannot accept more bills.

References Cited

UNITED STATES PATENTS

| | | | |
|---|---|---|---|
| 2,986,328 | 5/1961 | Delas | 194—4 X |
| 3,072,237 | 1/1963 | Simjian | 194—4 |
| 3,112,019 | 11/1963 | Simjian | 194—2 |
| 3,186,531 | 6/1965 | Adams | 194—10 |
| 3,250,363 | 5/1966 | Hooker | 194—10 |

STANLEY H. TOLLBERG, *Primary Examiner.*